Oct. 24, 1950     H. D. RADFORD ET AL     2,526,899
PROCESS OF MAKING METHYL BENZENES
Filed Dec. 27, 1946
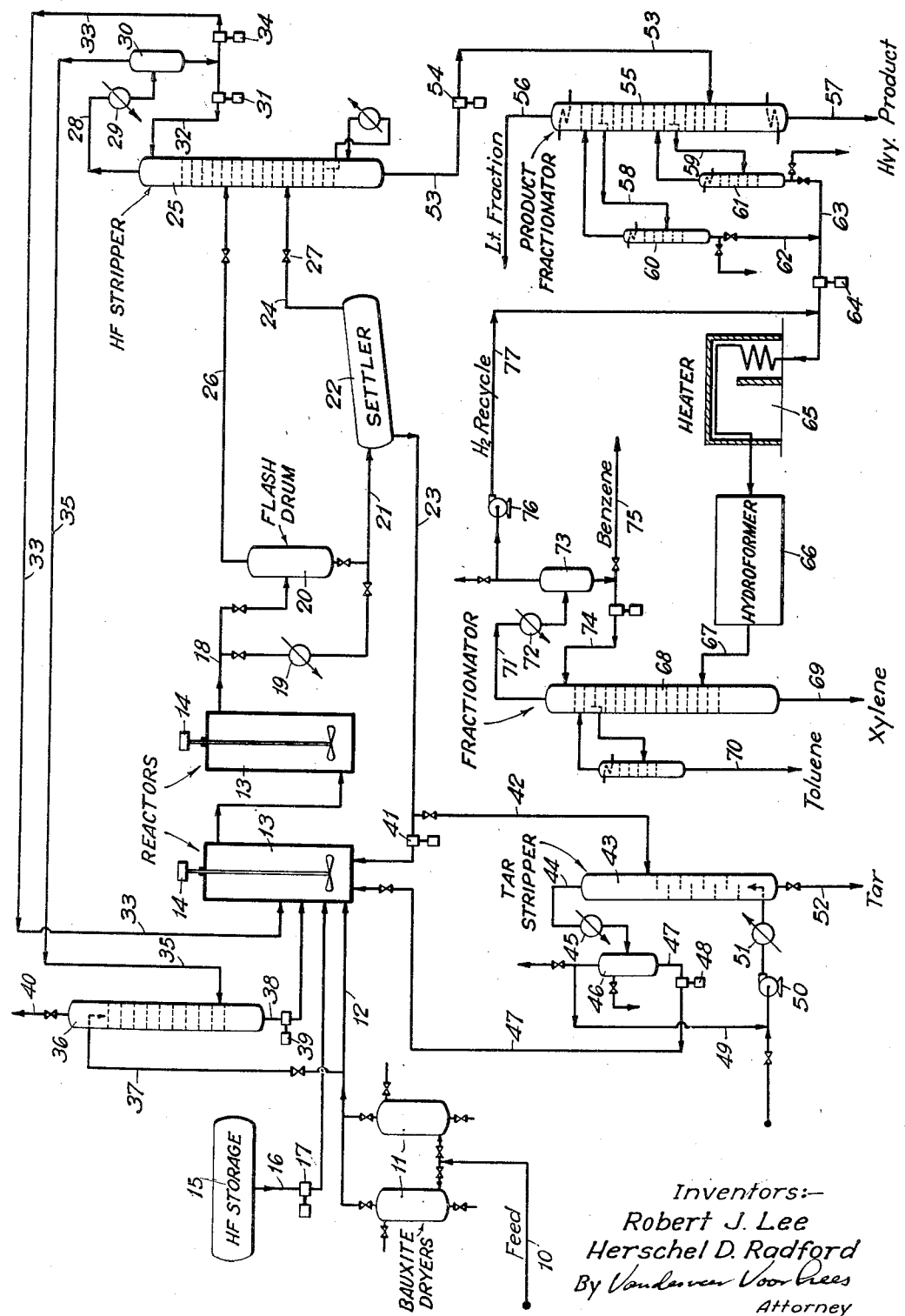
Inventors:—
Robert J. Lee
Herschel D. Radford
By Vandeveer Voorhees
Attorney Patented Oct. 24, 1950

2,526,899

UNITED STATES PATENT OFFICE 2,526,899

PROCESS OF MAKING METHYL BENZENES

Herschel D. Radford, Columbia, Mo., and Robert J. Lee, La Marque, Tex., assignors to Pan American Refining Corporation, Texas City, Tex., a corporation of Delaware Application December 27, 1946, Serial No. 718,852

4 Claims. (Cl. 260—668)

This invention relates to a process of making aromatic compounds from petroleum oils and more specifically to a process for making methyl benzene compounds from such stocks by catalytic conversion. It has heretofore been the practice to make aromatic compounds from petroleum hydrocarbons by conversion of straight-run napthas in the presence of dehydrogenating catalysts, generally a sixth group metal oxide deposited on alumina. In such a process it has been advantageous to employ a minimum amount of hydrogen to maintain catalyst activity, the aromatization reaction proceeding at a temperature of the order of 900 to 1100° F.

We have now discovered a method of making aromatic hydrocarbons from petroleum stocks which yields predominantly methyl benzene compounds by a two-stage reaction in which methylcyclohexanes are a primary product of the first stage, these being subsequently dehydrogenated in the second stage to yield methyl benzenes. The catalyst employed in the first stage is hydrofluoric acid. The process is illustrated by a drawing which shows schematically an apparatus for effecting the production of methylcyclohexanes followed by their dehydrogenation to methyl benzenes.

Referring to the drawing, the feed stock enters by line 10 and is effectively dried in driers 11. Any suitable means for drying may be employed, such as distillation and stripping to remove water, but in the drawing we have illustrated bauxite towers which can alternately be regenerated when substantially saturated with water absorbed from the stock.

The feed stock employed in our process is preferably a petroleum gas oil, e. g. Mid-Continent gas oil, altho we may use a variety of stocks such as kerosene, synthetic oils from the Fischer process, and even a reduced crude oil. We prefer to use saturated stocks, preferably straight-run distillates boiling above the gasoline boiling range.

After thoroughly drying in towers 11, the oil flows by line 12 to reactors 13 which are shown connected in series to provide good control of contact with the catalyst employed. The reactors may be provided with some means of mechanical agitation such as stirrers 14 as indicated. Orifice mixers or other mixing devices may also be used.

The catalyst, hydrofluoric acid, is preferably supplied to the process in liquid anhydrous form and it is herein referred to by the chemical symbol HF. Altho substantially anhydrous acid is most effective, we may employ HF containing a small amount of water, e. g. 5 to 15 per cent. If the amount of water accumulated in the system exceeds this amount, it is desirable to withdraw the catalyst from the system and replace it with anhydrous HF continuously or periodically.

Referring again to the drawing, the catalyst is supplied from storage reservoir 15 and flows by line 16 and pump 17 into reaction vessels 13 where it is intimately contacted with the hydrocarbon stock undergoing conversion therein. The volumetric ratio of liquid HF to hydrocarbon oil in the reactor is preferably in the range of about 1:1 to 4:1. Altho we may employ lesser amounts of catalyst, particularly when operating at higher temperatures and at correspondingly higher pressures, it is not generally feasible to conduct the reaction at a catalyst-to-oil ratio of less than about 0.5. The pressure maintained in the reaction vessels 13 is usually somewhat greater than that corresponding to the vapor pressure of HF at the temperature employed. Thus, when operating at a temperature of about 300° F., a pressure of about 700 to 900 p. s. i. is adequate to maintain the HF in the liquid phase.

The time of contact in reactors 13 is best expressed by the weight-hourly-space-velocity, or relative weight velocity, which is the weight of oil charged per hour per unit of catalyst in the reaction zone. A relative weight velocity within the range of about 0.1 to 2 pounds of hydrocarbon per hour per pound of catalyst describes a typical range of velocities, higher velocities being employed at higher temperatures. In general, the temperature should be in the range of about 200 to 400° F., a temperature of 325° F. being suitable in most cases.

From reactor 13 the products flow by line 18 either to cooler 19 or flash drum 20. From here the products flow by line 21 into settler 22 where the HF catalyst-tar phase separates as a lower layer which is drawn off by line 23. The upper layer or oil phase is conducted by line 24 to HF stripper 25. If flash drum 20 is employed, the vapor phase comprising mostly HF and fixed gases is conducted by line 26 directly to stripper 25. If desired, settler 22 may be maintained at higher pressure than that of stripper 25, the additional pressure drop taking place at valve 27.

From the top of HF stripper 25 there is removed by vapor line 28 HF vapors and light hydrocarbons, butane and fixed hydrocarbon gases, altho the amount of such gases is low. HF is condensed in coil 29 and collected in reflux drum 30 from which a regulated stream is sent by pump 31 and reflux line 32 back to the stripper. The remainder is conducted by line 33 and pump 34 back to reactor 13. Uncondensed hydrocarbon gases are withdrawn from the top of reflux drum 30 and led by line 35 preferably under moderate pressure to tower 36, wherein the HF may be recovered by washing the gases with charge oil introduced by valved line 37. The HF-oil solution flows via line 38 and pump 39 into reactors 13. Uncondensed gases are discharged by line 40 leading to a fuel system or a recovery system for recovering butane, propane, H$_2$S, and any unrecovered HF. In usual operation, the amount of light hydrocarbon gases produced in the process is sufficiently small so that no special provision is necessary for their recovery in the products.

The major part of the HF catalyst employed in the reaction is recovered as a sludge or solution with tar in the bottom of settler 22. From here it is conducted by line 23 and pump 41 back to reactor 13. It is necessary, however, to eliminate from the system an incremental part of the tar and recover HF from the part eliminated. This can be accomplished by withdrawing a portion of the sludge by line 42 leading to stripper 43 wherein it is stripped at about 350 to 600° F. by a current of hot hydrocarbon vapor flowing upwardly therethru. The vapors of hydrocarbon and HF are conducted by line 44 to cooling coil 45 and thence to separator 46 wherein recovered HF is collected and withdrawn by line 47 and pump 48 which forces it back into reactors 13. The hydrocarbon vapors employed in the stripping, e. g. propane or butane, are recycled by line 49 and blower 50 thru heater 51 and thence to the lower part of stripper 43. The tar, now substantially free of HF, is withdrawn from the stripper by line 52.

The heavy hydrocarbon products including unconverted charging stock are withdrawn from the bottom of stripper 25 by line 53 and pump 54 which charges the products in fractionator 55. In fractionator 55 a light naphtha fraction is discharged at the top by vent line 56 and heavy unconverted oil, e. g. gas oil, is withdrawn at the bottom by line 57. This oil may be recharged to the process thru line 10, if desired. While the light naphtha in line 56 may be stabilized and then employed as an ingredient of motor fuel, intermediate fractions comprising mainly monomethyl-, dimethyl- and trimethylcyclohexanes, are withdrawn as side streams by lines 58 and 59 into side fractionators 60 and 61, respectively. These fractionators may be operated to produce any desired methylcyclohexane fraction for further conversion into methylated benzenes. The fractionated product from either one or both of the side fractionators 60 and 61 can be conducted by lines 62 and/or 63, pump 44, and thence thru heater 65 where they are heated up to suitable aromatization temperature, e. g. 900 to 975° F., and contacted with hydroformer catalyst, e. g. 10% molybdena on active alumina, in reactor 66 where the methylcyclohexanes are converted to methyl benzenes. The converted products are conducted by line 67 to fractionator 68 where the aromatized products are separated into the desired fraction. Thus xylene may be withdrawn at the bottom by line 69, toluene as a side cut by line 70, and benzene on the top of the column by line 71 leading to condenser 72 and receiver 73. A portion of the benzene is refluxed back to column 68 by line 74 and production benzene is removed by line 75. As is common practice in hydroforming, a stream of hydrogen can be recycled thru the hydroformer by withdrawing hydrogenous gases from the top of receiver 73 and conducting them by blower 76 and line 77 back to the inlet of heater 65. The amount of hydrogen so recycled may be about 1000 to 3500 cu. ft. per barrel12 of stock treated. Where certain special catalysts are employed in hydroformer 66 such as nickel sulfide-tungsten sulfide, the recycling of hydrogen can be dispensed with.

If hydroformer 66 is charged with a closely fractionated stream of cyclohexane or methylcyclohexane, the product is largely the corresponding aromatic hydrocarbon and requires very little additional fractionation following hydroforming. Thus where toluene is the product principally in demand, we fractionate out a monomethylcyclohexane fraction in tower 55 and charge it alone to the hydroformer 66 for the production of toluene. If cyclohexane, $C_6H_{12}$, is charged to the hydroformer the product is mainly benzene, while if dimethylcyclohexane is charged, the product is xylene.

In general, some cycloparaffins will be found in the aromatic product from the hydroformer and these may be separated from close-boiling aromatics by solvent distillation, for example, by simultaneous distillation and extraction with a suitable polar solvent such as phenol, nitrobenzene, nitromethane or the like, in a manner well known in the art. Liquid-liquid extraction with selective solvents such as liquid $SO_2$ may also be employed. A well-fractionated aromatized distillate may contain about 50 to 90 per cent of aromatics, the remainder being cycloparaffins. These may be recycled to the aromatization step of the process, if desired, or where substantial open-chain paraffins are present, to the HF cracking step of the process.

One of the unique characteristics of our process is the conversion of petroleum hydrocarbons into cyclohexane and its derivatives in major part as will be shown by the data following. Analyses indicate substantially no conversion into naphthenes of the cyclopentane type. As a result, the products of HF conversion are quite readily aromatized in high yield to produce valuble aromatic compounds. The following results were obtained in two runs in which Mid-Continent gas oil, having an initial boiling point of 443° F., 90% of 581° F., and a final boiling point of 654° F. with an A. P. I. gravity of 37.9 was charged to a reactor in which agitation was obtained solely by the action of the liquid stream flowing therethru. Following are the conditions of reaction:

| | Run 1 | Run 2 |
|---|---|---|
| Average Temperature, °F | 320 | 350 |
| Reactor Pressure, p. s. i. g | 900 | 900 |
| Charging Rate, lbs./hr | 0.597 | 1.98 |
| Relative weight velocity, lb./hr./lb. HF | 0.14 | 1.1 |

From this operation the following yields were obtained:

| | Run 1 | Run 2 |
|---|---|---|
| | Weight per cent | Weight per cent |
| Dry Gas (C$_3$ and lighter) | 2.2 | .8 |
| Excess Isobutane | 10.1 | 2.54 |
| Gasoline (400° E. P. and 10.5 R. V. P.) | 40.4 | 33.00 |
| Unconverted Gas Oil | 26.3 | 46.50 |
| Tar | 21.0 | 17.16 |

A typical analysis of the gasoline fraction is as follows:

| | Weight per cent |
|---|---|
| Paraffins, $C_6$—180° C | 38.5 |
| Cyclohexane | 1.3 |
| Monomethylcyclohexane | 9.7 |
| Dimethylcyclohexanes | 14.1 |
| Trimethylcyclohexanes | 7.4 |
| Tetramethyl- and ethylmethylcyclohexanes | 4.9 |
| Naphthenes boiling from 155 to 180° C | 7.0 |
| Uncharacterized | 17.1 |
| Total | 100.0 |

No cyclopentane derivatives were detected.

From these figures it is noted that the gasoline fraction contained 37.4% of naphthenes having 6 member rings suitable for aromatization. The aromatization of this stock gives a high yield of easily recoverable aromatic compounds of great value as solvents and as intermediates in the chemical industry, particularly toluene and the xylenes.

A suitable fraction for aromatization may have a relatively wide boiling range of about 175 to 250° F. and will consist largely of cyclohexane and its monomethyl and dimethyl derivatives. On aromatizing this fraction there is obtained a mixture of benzene, toluene and xylene which is separated readily by distillation. Pure benzene is recovered from a fraction boiling about 170–185° F. by freezing and crystallization. Toluene is recovered from a fraction boiling about 220–235° F. by solvent distillation with phenol, the toluene passing out the bottom of the fractionator with the phenol and being distilled therefrom with a purity of about 96 to 99%. Xylenes are recovered in the same manner from a fraction boiling about 235 to 250° F. altho, for most solvent uses, it is not necessary to extract the xylene fraction.

Having thus described our invention what we claim is:

1. The process of making methyl benzenes which comprises contacting a heavy petroleum hydrocarbon oil boiling above gasoline with a catalyst consisting essentially of hydrofluoric acid at a temperature of about 300 to 400° F., the ratio of catalyst to oil being at least about 0.5 and relative weight velocity about 0.1 to 2, separating a gasoline fraction from other hydrocarbon products and hydrofluoric acid, further fractionating said gasoline fraction, separating therefrom a mixture of methyl cyclohexanes boiling in the range of about 175 to 250° F., said mixture being substantially free of cyclopentanes, dehydrogenating said methyl cyclohexanes in the presence of an aromatization catalyst at a temperature of about 900 to 975° F. in the presence of hydrogen and fractionating the aromatization products to recover methyl benzenes therefrom.

2. The process of making toluene which comprises contacting a heavy petroleum hydrocarbon boiling above gasoline with a catalyst consisting essentially of hydrofluoric acid at a temperature of about 300 to 400° F., the ratio of catalyst to oil being at least about 0.5 and relative weight velocity about 0.1 to 2, separating hydrocarbon conversion products from hydrofluoric acid catalyst, fractionating said hydrocarbon conversion products and separating therefrom a fraction consisting essentially of paraffin hydrocarbons and monomethylcyclohexane, dehydrogenating said monomethylcyclohexane fraction in the presence of an aromatization catalyst at a temperature of about 900 to 975° F. in the presence of hydrogen, thereby converting said monomethylcyclohexane to toluene and recovering said toluene from the aromatization products.

3. The process of claim 1 wherein the petroleum hydrocarbon charging stock for the process is a gas oil fraction.

4. The process of claim 1 wherein the petroleum hydrocarbon employed as a charging stock in the process is a reduced crude oil.

HERSCHEL D. RADFORD.
ROBERT J. LEE

REFERENCES CITED

The following references are of record in the file of this patent:

UNITED STATES PATENTS

| Number | Name | Date |
|---|---|---|
| 2,249,337 | Visser et al. | July 15, 1941 |
| 2,349,826 | Layng | May 30, 1944 |
| 2,357,495 | Bloch | Sept. 5, 1944 |
| 2,392,749 | Lewis et al. | Jan. 8, 1946 |
| 2,403,649 | Frey | July 9, 1946 |